UNITED STATES PATENT OFFICE.

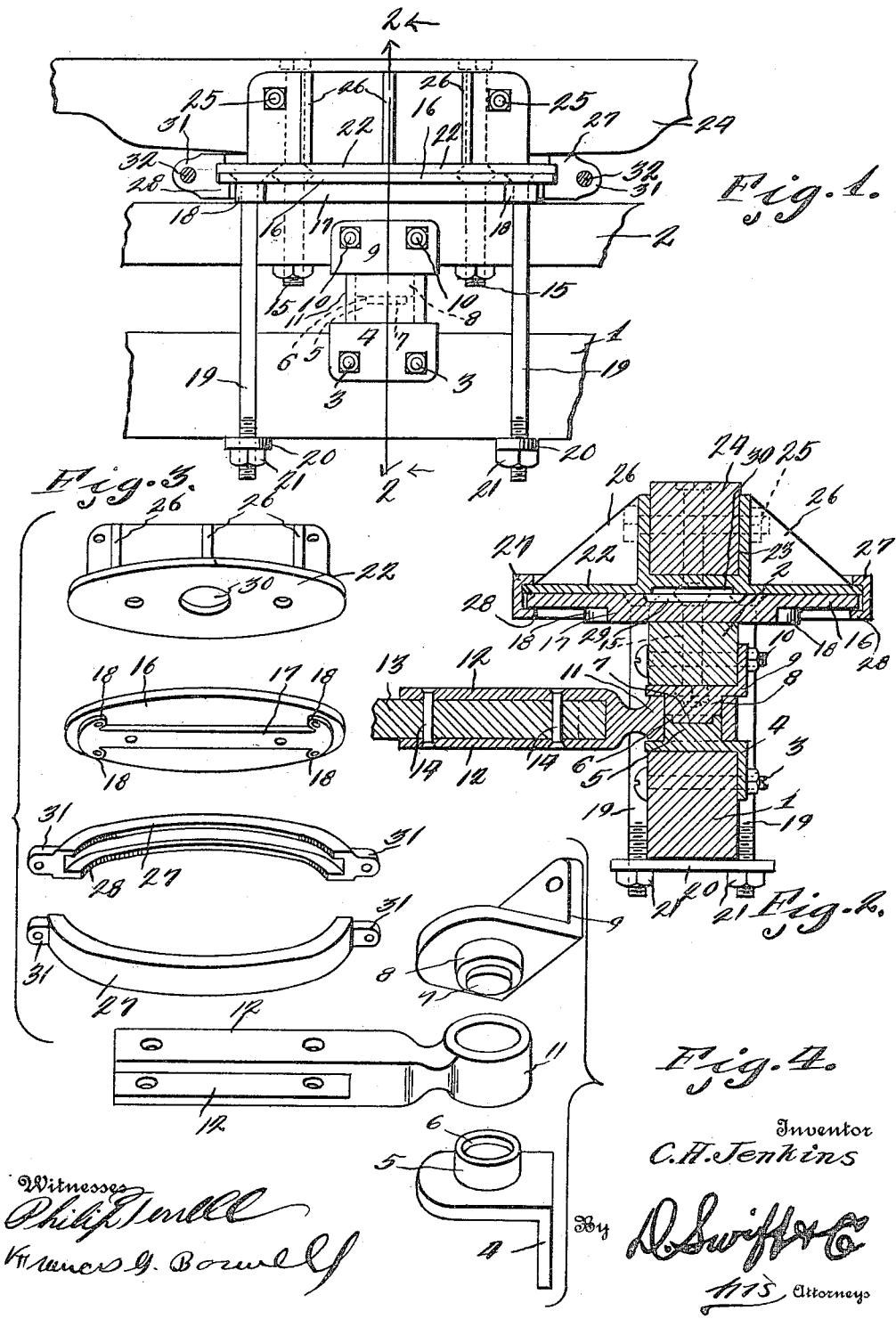

CHARLES HIRAM JENKINS, OF GARFIELD, WASHINGTON.

FIFTH-WHEEL OR COUPLING-GEAR.

1,225,637.   Specification of Letters Patent.   Patented May 8, 1917.

Application filed July 21, 1916. Serial No. 110,544.

*To all whom it may concern:*

Be it known that I, CHARLES HIRAM JENKINS, a citizen of the United States, residing at Garfield, in the county of Whitman, State of Washington, have invented a new and useful Fifth-Wheel or Coupling-Gear; and I do hereby declare the following to be a full, clear, and exact description of the invention, such as will enable others skilled in the art to which it appertains to make and use the same.

This invention relates to the art of running gear for vehicles, and more especially to an improved fifth wheel or coupling vehicle gear between the body supporting bolster and the axle bolster.

Therefore, one of the objects of the invention is to provide a device of this kind, so constructed as to avoid the use of the usual king pin.

Another object of the invention is to provide a device of this kind having means, whereby the reach of the running gear may be connected swivelly to the fifth wheel or vehicle running gear coupling.

In practical fields, the details of construction may necessitate alterations, falling within the scope of what is claimed.

The invention comprises further features and combination of parts, as hereinafter set forth, shown in the drawings and claimed.

In the drawings:—

Figure 1 is a view in front elevation of the improved fifth wheel or coupling gear for vehicle running gear.

Fig. 2 is a sectional view on line 2—2 of Fig. 1.

Fig. 3 illustrates perspective views of a pair of fifth wheel disk plates and the clamping rings therefor, whereby said plates may move axially.

Fig. 4 illustrates perspective views of the connection between the forward end of a reach not shown and the axle and its bolster.

Referring more especially to the drawings, 1 designates the axle of the vehicle, and 2 its bolster. Secured to the axle 1 by means of suitable bolts 3 is an angle plate 4 having a boss 5 thereon, which boss 5 is provided with circular depression 6, to receive a circular reduced extension 7 of the boss 8, which is formed integral with the angular plate 9, which is secured to the axle bolster 2 by means of the bolts 10. However, before engaging the reduced extension in the depression 6, one of said bosses 5 or 8, or both together, are inserted into the collar 11, which is provided with rearwardly extending spaced plates 12, between which the reach 13 is secured by the rivets 14, thereby connecting the reach, so that the axle and its bolster will swivel or pivot on the reach. Secured by means of bolts 15 to the upper face of the bolster 2 is a circular disk fifth wheel plate 16. The under face of this plate 16 is provided with a transverse elongated boss or rib 17, the greater portion of which is of a width equal to the width of the bolster 2, thereby constituting means to hold the disk fifth wheel plate spaced above the bolster 2, for the purpose hereinafter set forth. The boss 17 at both ends is provided with lateral extensions 18, which project forwardly and rearwardly beyond the forward and rear faces of the bolster 2. Passing through the plate 16 and through the extensions 18 are bolts 19, the lower ends of which pass through the transverse plates or straps 20 (which are disposed transversely of the under face of the axle 1) and are provided with nuts 21, thereby clamping the plate 16, the bolster 2 and the axle 1 together, so that said parts will move as one body. A second disk fifth wheel plate 22 is provided, and which plate upon its upper face is supplied with a U-shaped portion 23, between the flanges of which the vehicle body supporting bolster 24 is secured by the bolts 25. The flanges of said U-shaped part are reinforced relatively to the plate 22 by means of the ribs 26. It is to be observed that the plate 22 is a trifle larger than the plate 16, so that the clamping ring 27 (which is U-shaped in cross section and is constructed in two sections) may be clamped tight to the plate 22, so that the plate 16 will freely move axially relatively to the plate 22 and within the clamping ring, the lower flange 28 of which underlies the plate 16 near its edge, whereby the plate 16 may freely rock axially, incident to the axle and bolster 2 being oscillated. The adjacent faces of the plates 16 and 22 are provided with circular depressions 29 and 30, which reduce the bearing surface between the two plates, and at the same time form a cavity for the reception of lubricant and waste, so as to keep the plates 16 and 22 well lubricated. The two sections of the clamping ring 27 are provided with ears 31, to receive the bolts 32. It is to be observed that the bolts 15, 19 and 25 have their heads embedded or countersunk in the adjacent faces of said plates 16 and 22. It is to be noted that the bottom of the space between the flanges of the U-shaped portion of said plate 22 is raised to hold the plate 22 spaced below the bolster 24, whereas the boss 17 spaces the plate 16 from the bolster 2, to permit the clamping ring to clamp the two plates 16 and 22 swively together.

The invention having been set forth, what is claimed as new and useful is:—

1. In a fifth wheel for vehicles, the combination of a body supporting bolster, an axle bolster, a pair of circular plates, one plate having a base for the body bolster at a higher level than the upper face of said plate and having flanges on opposite sides of said base for connection to the body bolster, the other plate having an elongated transverse boss connecting it to the axle bolster, a clamping device for connecting the plates, said transverse boss having extensions at each end wherein supporting bolts are secured, said boss and said base between said flanges acting as a spacing means to prevent the clamping device from engaging either the axle bolster or body bolster, an axle, and a stirrup bolting means connecting said axle and the lower plate of said pair of plates with the axle bolster intervening.

2. In a fifth wheel for vehicles, the combination of a body supporting bolster, an axle bolster, a pair of circular plates differing in diameter, one plate having a base for the body bolster at a higher level than the upper face of said plate and having flanges on opposite sides of said base for connection to the body bolster, the other plate having an elongated transverse boss for connecting it to the axle bolster, a clamp separable into halves and U-shaped in section for connecting the plates together, said clamp performing the functions of a king-pin, said transverse boss having extensions at each end wherein supporting bolts are secured, said boss and said base between said flanges acting as a spacing means to prevent the clamp from engaging either the axle bolster or body bolster.

In testimony whereof I have signed my name to this specification in the presence of two subscribing witnesses.

CHARLES HIRAM JENKINS.

Witnesses:
J. W. ROUDEBUSH,
MARY A. MCCARTHY.